March 20, 1945.　　A. J. J. VAN AKKEREN　　2,371,935
JOINT NAIL OR CLIP
Filed Sept. 24, 1941
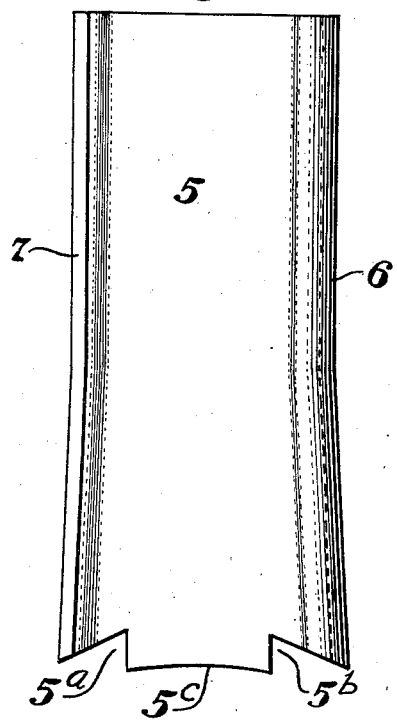
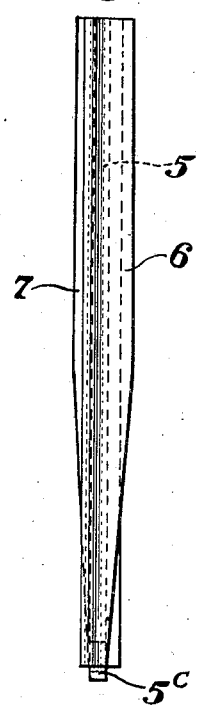
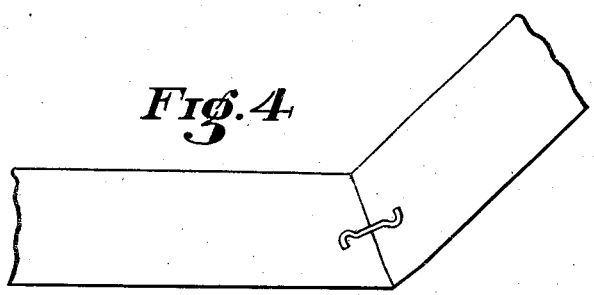
Inventor:
ANTONIUS J.J. VAN AKKEREN
By
Attorney.

Patented Mar. 20, 1945

2,371,935

UNITED STATES PATENT OFFICE 2,371,935

JOINT NAIL OR CLIP

Antonius J. J. van Akkeren, The Hague, Netherlands; vested in the Alien Property Custodian Application September 24, 1941, Serial No. 412,181
In the Netherlands October 19, 1940

5 Claims. (Cl. 85—11)

This invention relates to a joint nail or clip such as is extensively used, for instance by cabinet makers, for drawing together two pieces of wood or like material into which the nail is adapted to be driven. For this purpose, abutting pieces of wood or other material are provided with saw cuts or kerfs in the opposing faces thereof into which cuts or kerfs the joint nail is entered and thereafter driven.

A known type of joint nail or clip embodies a central flat web and converging uniformly inclined side flanges, a penetrating cutting edge and a driving head at the ends of the web extending beyond the said flanges, the web intermediate the flanges having a wedge shaped appearance so that it is narrower at the driving end than at the penetrating end. This known type has the disadvantageous feature that, when the width of the kerfs exceeds the thickness of the web of the joint nail, the latter, when driven home, is prevented from movement in a direction at right angles to its web only by the clamping force between the wood and the sharp edges of the flanges. Owing thereto, the joint is not capable of taking up any considerable shearing stresses. Moreover, the manufacturing costs of this clip are rather high.

Another known type of joint nail comprises a piece of metallic strip having a central plane web section the opposite side edges of which are in divergent relation so as to impart a flat wedge-shaped appearance thereto, the penetrating end comprising a continuous toothed cutting edge, the web at the inclined side edges thereof having a corrugated section unitary with the web and parallel to the divergent side edges thereof, the corrugated members being oppositely inclined and adapted to embed themselves in the direction of their length into the material during the driving of the joint nail. Even if the thickness of its web should be appreciably smaller than the width of the kerfs in the pieces to be jointed, this fastener will ensure a joint capable of taking up considerable shearing stresses. However, the corrugations may not have any appreciable height lest the walls of the kerfs will chip during the driving of the nail, so what said joint does not offer sufficient resistance against tensile stresses.

One object of the present invention is to provide a fastener of the type referred to which, owing to its novel profile, ensures a joint that is capable of taking up both considerable shearing stresses and considerable tensile stresses, another object being the provision of a fastener that can be manufactured cheaply as drop stampings.

In accordance with this invention, the joint nail or clip comprises a substantially rectangular, slightly wedge-shaped metallic web having side flanges each merging into said web through a low corrugation in such a manner that of each flange the edge—except through the penetrating end portion—and the generatrix of its corrugation passing through the crest thereof lie on opposite sides of the central plane of the web at distances exceeding half the thickness of the web, the latter being somewhat wider and the flanges being somewhat narrower at the penetrating end than at the driving end.

The above mentioned advantages of the invention are accomplished by means of the improvements disclosed in the accompanying drawing forming a part of the specification, and in which:

Fig. 1 is a face elevation of one embodiment of the improved fastener,

Fig. 2 is a side edge elevation of said fastener,

Fig. 3 is an underneath plan view of the fastener, and

Fig. 4 illustrates the manner in which the fastener is used for joining together two pieces of wood.

The illustrated joint nail embodies a central, substantially rectangular web 5 having side flanges 6 and 7 pointing in opposite directions. Each flange merges into the web through a low corrugation which is U-shaped in transverse cross section. When the fastener has been driven home in the kerf of the two pieces to be joined, it is clamped, on either side, between the walls of the kerf in such a manner that the crest of the corrugation is forced against one of said walls and the opposite flat face of the web 5 is forced against the other. This clamping action prevents any movement of the nail in a direction at right angles to said walls.

The flanges 6 and 7, by entering into material surrounding the kerfs, ensure adequate resistance against tensile strains. Moreover, these flanges cause the pieces of wood to be firmly drawn together, owing to the slight, uniform increase of the width of the web between the flanges from the middle portion of the nail towards the penetrating end thereof.

The penetrating end of the web 5 has recesses 5a, 5b on either side. The remaining central portion 5c of said end may be provided with a cutting edge, although this is not necessary.

What I claim is:

1. A joint nail comprising a plane generally rectangular metal web having a driving end and an entering end, the side edges of said web extending substantially parallelly from the driving end to a point intermediate the driving end and the entering end, the said side edges diverging slightly from the said point to the entering end of the web, whereby the entering end of the web is wider than the driving end of the web, the said side edges terminating in flanges consisting of relatively shallow rounded corrugations of relatively small cross section, with the convex portions projecting beyond opposite sides of the web, the free edges of the corrugations having extensions extending beyond opposite sides of the web from the convex portions.

2. A joint nail according to claim 1 wherein said extensions are plane and are arranged at right angles to the web.

3. A joint nail according to claim 1 wherein said extensions are plane and are arranged at right angles to the web, and wherein the flanges taper from a point intermediate the ends of the web to the said entering end of the web.

4. A joint nail according to claim 1 wherein said extensions are plane and are arranged at right angles to the web, and wherein the free edges of the extensions are tapered toward the entering end of the web.

5. A joint nail according to claim 1 wherein the entering end of the nail is cut away through the flanges and through adjacent portions of the web to define a cutting terminal less wide than the entering end of the wedge, said terminal extending longitudinally beyond the remainder of the nail.

ANTONIUS J. J. van AKKEREN.